TUBE FLARING MACHINE

Original Filed May 18, 1962 4 Sheets-Sheet 1

INVENTOR.
WILLIS G. GROTH
BY Smyth, Roston & Pavitt
ATTORNEYS

TUBE FLARING MACHINE

Original Filed May 18, 1962 4 Sheets-Sheet 2

INVENTOR.
WILLIS G. GROTH

BY Smyth, Roston & Pavitt

ATTORNEYS

TUBE FLARING MACHINE

Original Filed May 18, 1962 4 Sheets-Sheet 3

INVENTOR.
WILLIS G. GROTH
BY Smyth, Roston & Pavitt
ATTORNEYS

INVENTOR:
Willis G. Groth

By Smyth, Roston & Pavitt

Attorneys

United States Patent Office

Re. 26,231
Reissued June 27, 1967

26,231
TUBE FLARING MACHINE

Willis G. Groth, Granada Hills, Calif., assignor to Teledyne, Inc., a corporation of Delaware Original No. 3,170,502, dated Feb. 23, 1965, Ser. No. 196,015, May 18, 1962. Application for reissue Nov. 5, 1965, Ser. No. 515,798
12 Claims. (Cl. 72—94)

Matter enclosed in heavy brackets [ ] appears in the original patent but forms no part of this reissue specification; matter printed in italics indicates the additions made by reissue.

The invention described herein may be manufactured and used by or for the Government of the United States of America for governmental purposes without the payment of any royalties thereon or therefor.

The invention relates to a means for producing tube flares and more particularly to a machine for flaring the end portions of tubes.

Reliability of demountable tubing connectors of the type in which the flared end of a tube is clamped by a circular collar to a cone surface of a fitting becomes of paramount importance in a large liquid propellant rocket vehicle which contains thousands of such connectors. Essential to the leak integrity of these connectors is a tube flare which has a uniform wall thickness and a smooth surface.

Heretofore, however, conventional tube flaring machines in using a split female die failed to obtain, consistently, flares of uniform thickness and surface regularity because the split portions of the female die would not fit together perfectly. Attempts to manufacture the split female die to closer tolerances failed to eliminate the problem.

Accordingly, it is an object of this invention to provide a means for consistently producing tube flares having a *circumferentially* uniform thickness and a smooth surface.

Another object is to provide a tube flaring machine with a unitary female die whereby the problems attendant by the use of a split female die are eliminated.

Other objects, uses, and advantages of the present invention will become apparent as the description proceeds.

The *presently preferred embodiment of the* invention consists of a tube flaring machine having a housing which is supported so as to rotate about its own longitudinal axis. Rotatively secured to the housing is a unitary female die having a large central aperture adapted to receive the end portion of a tube which is to be flared. The aperture has a diameter larger than that desired for the completed flare so that the tube may easily be withdrawn from the aperture following the flaring operation. The center of the aperture of the female die is located eccentric to the longitudinal axis of the housing. A male die is also rotatively secured to the housing in a cooperative relationship with the female die.

In operation, the end portion of a tube is inserted within the aperture of the female die and against the surface of the aperture. Then, the male die is shifted into contact with inner surface of the tube end portion to deform [and] *or* flare a small portion of the tube toward or against the flaring surface of the female die. During this time, the housing is rotated about its longitudinal axis in order that a substantial rolling contact between the tube and the flaring dies occurs which follows the circumference of the tubes and thus forms a flare of *circumferentially* uniform thickness.

This will be more readily understood by the following detailed description when taken together with the accompanying drawings in which.

Figure 1:
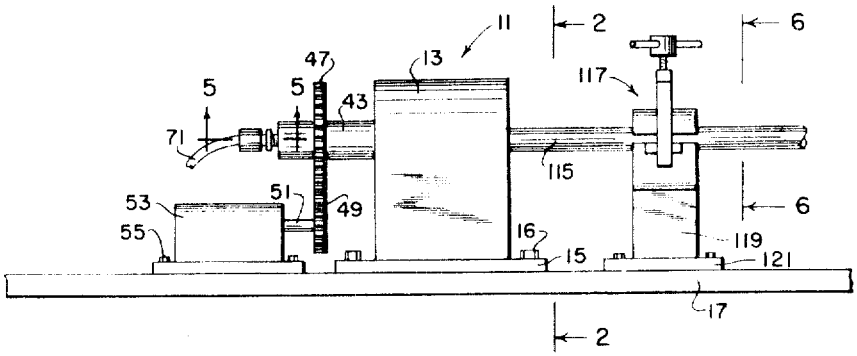
FIGURE 1 is an elevation view of a tube flaring machine.

Referring now to the drawings, there is shown in FIGURE 1 a tube flaring machine 11 having a tubular shell 13 with a base portion 15 secured by bolts 16 to a bench or other suitable support 17. As shown best in FIGURES 3 and 4, *what may be termed a first support means in the form of* a cylindrical housing 19 having an interior chamber 21 is rotatively mounted within the tubular shell by bearings 23 so that the housing 19 may rotate about its central or longitudinal axis *which axis may be aptly termed the main axis of rotation.* The housing 19 has a cylindrical side wall 27 with a front wall 29 and a rear wall 31 integral therewith.

The rear wall 31 has a rectangular slot 33 therein with a rear countersunk portion 35 on each long side thereof resulting in two flanges 37. The rectangular slot 33 and its countersunk portion 35 extend radially [outward from the longitudinal axis of the housing 19] *of the main axis of rotation.* A closure plate 39 is secured by bolts 41 or the like to the outer surface of the rear wall 31 of the housing 19.

The housing 19 is rotated within the tubular shell 13 [by] *and for this purpose is mounted on* a tubular shaft 43 which is integral with the closure plate 39 and which extends outwardly therefrom along [a longitudinal axis which coincides with the longitudinal axis of the housing 19] *the main axis of rotation.* The passageway 45 of the tubular shaft 43 extends through the closure plate 39 and exits into the slot opening 33 of the housing's rear wall 31. The tubular shaft 43 is provided with a gear 47 adjacent its distal end, as illustrated in FIGURE 1, which engages another gear 49 on the output shaft 51 of a motor 53. The motor 53 is secured by bolts 55 to the bench or common support 17.

Figure 3:
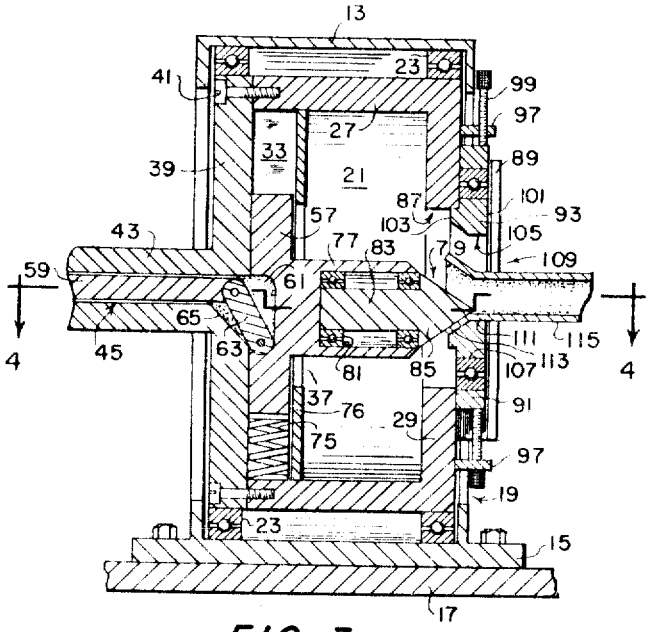
FIGURE 3 is a cross-sectional elevation view taken along line 3—3 of FIGURE 2.
Figure 4:
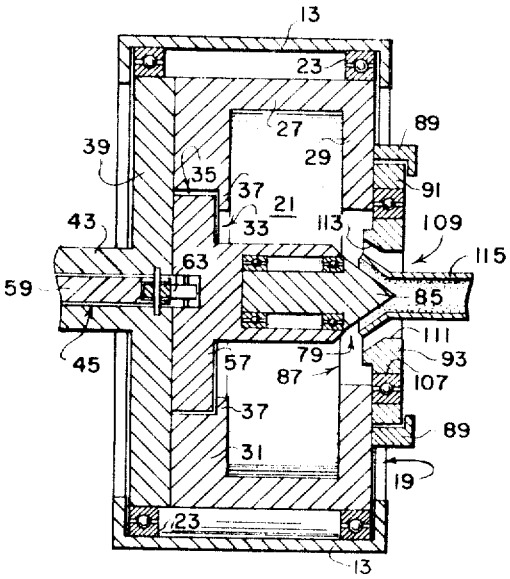
FIGURE 4 is a cross-sectional plan view taken along line 4—4 of FIGURE 3.

As shown in FIGURES 3 and 4, rectangular plate mount 57, fitted within the rectangular slot 33 and its countersunk portion 35, is restrained from movement along the [longitudinal axis of the housing 19] *main axis of rotation* by the flanges 37 formed by the countersunk portion 35. However, the plate mount 57 is sufficiently short as to be able to slide to and fro within the slot 33 and its countersunk portion 35.

The mount 57 is activated partly by a rod 59 slidably located within the passageway 45 of the shaft 43. For this purpose, the rear surface of the plate mount 57 has a rectangular recess 61, as illustrated in FIGURE 3, to provide room for a pivoting link 63 which is connected at one end to the forward portion of the rod 59 and at its other end to the sides of the recess 61. A portion 65 of the surface of the tubular passageway 45 is chamfered adjacent its exit opening from the closure plate 39 to provide space in which the link 63 may pivot.

Figure 5:
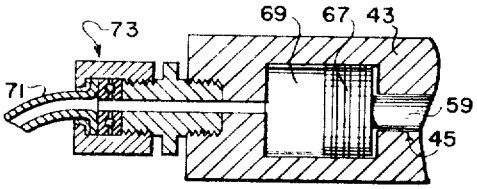
FIGURE 5 is a cross-sectional plan view taken along line 5—5 of FIGURE 1.

The rear end of the rod 59 has a piston 67 integral therewith, as illustrated in FIGURE 5, which is located within a large enlargement or cylinder portion 69 of the tubular passageway 45 within the shaft 43. Hydraulic fluid is supplied to the cylinder 69 by a line 71 which is joined to the rear end of the tubular shaft by a conventional rotary coupling 73.

Thus, it can be seen that as hydraulic fluid is forced into the cylinder 69 through the line 71, the rod 59 will be shifted forward causing the link 63 to apply a force on the rectangular mount 57 so it will slide radially to the [housing's longitudinal axis] *main axis of rotation.*

To enable the mount 57 to return to its normal position when the fluid pressure within the cylinder 69 is reduced, a coil spring 75, as shown in FIGURE 3, is located between the cylindrical side wall 27 and the plate mount 57. A short wall 76 extending between the flanges 37 confines the spring within the rectangular slot 33 and its countersunk portion 35.

The plate mount 57, as shown in FIGURE 3, has a tubular boss 77 projecting perpendicularly outward from its forward face so as to have a longitudinal axis located within a plane radial to the [longitudinal axis of the housing 19] *main axis of rotation.* A male tube flaring die 79 is symmetrically mounted for rotation by bearings 81 within the tubular boss 77. The male flaring die 79 consists of an elongated cylindrical member 83 with a large cone frustrum head 85 on its end which projects beyond the tubular boss 77. The cone angle of the head 79 is selected to correspond to the cone angle desired for the inner surface of a coupleted tube flare.

It is apparent that, when the rectangular mount 57 is shifted within the rectangular slot 33 and its countersunk portion 35, the longitudinal axis of the male die 79 will move within a plane radial to the [housing's longitudinal axis] *main axis of rotation.*

Figure 2:
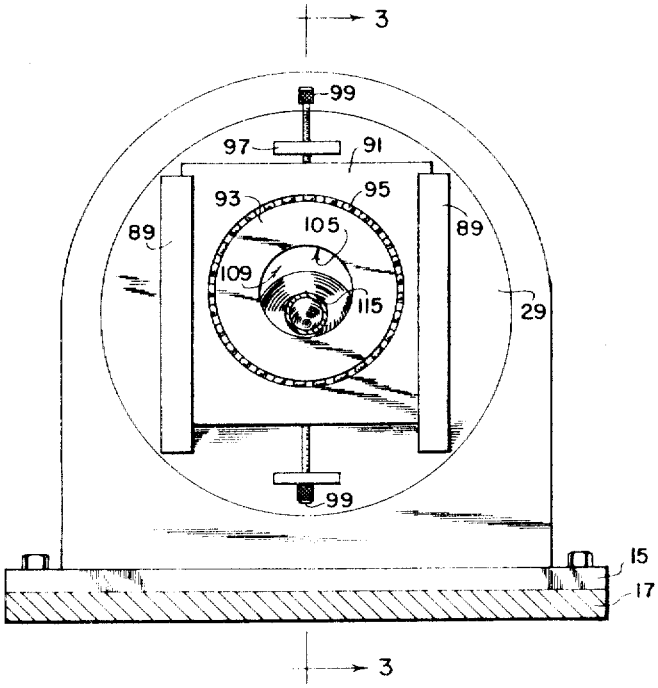
FIGURE 2 is a cross-sectional elevation view taken along line 2—2 of FIGURE 1.

The front wall 29 of the housing 19 is provided with a large aperture 87 having a center substantially aligned with the [housing's longitudinal or rotating axis] *main axis of rotation.* Secured to the outer surface of the front wall 29 adjacent opposite side portions of the aperture 87 are two L-shaped members 89, as illustrated best in FIGURES 2 and 4, which define a path which extends radially outward from the [housing's longitudinal axis] *main axis of rotation* in the same manner as the rectangular slot 33 and its countersunk portion 35.

Slidably restrained by the L-shaped members 89 is a rectangular support 91 having a unitary circular female die 93 rotatively mounted therein by bearings 95. The female die 93 is located [so as to have its center and transverse axis within the same plane, which extends radially from the housing's longitudinal axis, as the longitudinal axis of the male die 79] with its axis parallel with the main axis of rotation, the axis of the female die and the axis of the male die 79 being in a common plane that includes the main axis of rotation. [In operating position, the center of] *Thus both the male die 79 and* the female die 93 [will also be] *are* located eccentrically to the [housing's longitudinal axis] *main axis of rotation.*

Lugs 97 are secured to the outer surface of the front wall 29, one at each extremity of the path defined by the two L-shaped members 89. Screws 99 extend through threaded bores within the lugs 97 and engage opposed edge surfaces of the support 91 whereby it may be adjusted *radially of the main axis of rotation* along the path formed by the two L-shaped members 89.

As shown in FIGURE 3, the female die 93 has two large side surfaces 101 and 103 with coaxial inner and outer circular perimetric edge surfaces 105 and 107, respectively. The inner perimetric edge surface 105 defines the outer limits of an aperture 109 extending through the center of the female die 93. A portion 111 of the inner perimetric surface 105 adjacent the outer opening of the aperture 109 is shaped to form a cylindrical area while the remaining portion 113 of the inner perimetric surface 105 adjacent the opposite or inner opening of the aperture 109 is shaped to form a cone frustrum area. The cone angle of the cone frustrum area 113 is selected to correspond with the cone angle of the outer surface of the tube flare the machine 11 is adapted to make.

The parameters of the machine 11 are also designed so that the diameter of the aperture 109 is larger than the maximum diameter of the tube flare the machine 11 is adapted to make.

The cone shaped head 85 of the male die 79 extends through the inner opening of the female die's aperture 109, as shown in FIGURES 3 and 4. The contiguous portions of the cone frustrum surfaces of the head 79 and female die 93 are substantially parallel.

Figure 6:
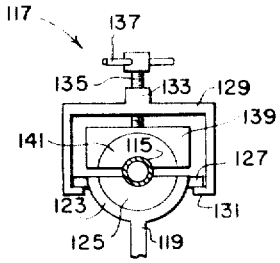
FIGURE 6 is a cross-sectional elevation view taken along line 6—6 of FIGURE 1; [and]

As shown in FIGURE 3, the end portion of a tube 115 which is to be flared by the machine 11 is located within the female die's aperture 109 and is [coaxially aligned with the longitudinal axis of the housing 19] *coaxial with the main axis of rotation.* To insure the tube 115 is located correctly, *what may be termed a second support means may be used in the form of* a tube clamp 117, as illustrated in FIGURES 1 and 6 [may be used].

The tube clamp 117 includes a pedestal 119 having a base 121 which is bolted to the common support 17. The pedestal 119 at its upper end is provided with upwardly curving arms 123 which define a semi-circular seat for a lower pipe holding section 125. The arms 123 are formed or provided at their upper ends with outwardly projecting catch lugs 127. An upper frame 129 having an inverted U-shape is provided with inwardly bent portions 131 adapted to engage underneath the catch lugs 127. A boss 133 is formed upon the top horizontal portion of the frame 127 through which is threaded a screw 135 having at its top a suitable handle 137. Within the frame 127, the screw 135 carries a bearing block 139 in which is formed a seat for the upper semi-circular tube holding section 141. The lower and upper tube holding sections 125 and 141, respectively, have suitable central semi-circular openings to grip the intervening tube 115. Thus, by turning the screw 135 downwardly the tube 115 will be firmly gripped between the sections 125 and 141, and by turning the screw 135 upwardly the tube 115 will be released.

In operation, the tube 115 is positioned *coaxially* of the main axis of rotation with its end projecting into the aperture 109 of the female die 91 and located over the cone frustrum surface area 113 of the female die 93. The tube 115 is then fixed into this position by the clamp 117.

Following the positioning of the tube 115, the female die 91 is adjusted *radially of the main axis of rotation* by screws 99 to place its inner cylindrical surface area 111 into contact with the outer surface of the tube 115. For proper operation the center of the female die's aperture 109 should be eccentric to the housing's longitudinal or rotating axis following the adjustment of the screws 99.

The motor 53 is then started so that the housing 19 will rotate about [its longitudinal axis] *the main axis of rotation* within the tubular shell 13. Concurrently, fluid is forced through line 71 into the cylinder 69 of the tubular shaft 43 causing the piston 67 and its attached rod 59 to shift forward and force the plate mount 57 to slide outwardly in order that the head 85 of the male die 79 will contact the inner surface of the tube 115 and form or flare it outwardly toward the contiguous cone surface area 113 of the female die 93.

Because of the thrust of the 115 against the inner perimetric surface 105 of the female die 91, the female die 91 will revolve about its center as the housing 19 rotates. Also, because the center of the female die 93 is eccentric to the housing's longitudinal or rotating axis, the female die 93 will also rotate about the housing's longitudinal axis. Thus, it is apparent that the contact between the outer surface of the tube 115 and the inner perimetric surface 105 of the female die 93 will revolve about the coincident axes of the housing 19 and the tube 115 even though the tube 115 remains stationary.

Since the longitudinal axis of the male die 79 is eccentric to the housing's longitudinal axis, the thrust and friction between its surface and the tube surface will also cause it to rotate about its own longitudinal axis when rotated about the housing's longitudinal axis.

Fluid is forced into the cylinder 69 within the tubular shaft 43 in gradual time increments so that the male die 79 will *shift radially outward of the main axis of rotation to* force the tube end portion 115 into a flare in the same corresponding time increments. Superior results are obtained if the time increment selected allows the surface contact between the tube 115 and the male die 79 to make one complete revolution about the housing's longitudinal axis 25.

After the end portion of the tube 115 is flared as shown in FIGURE 3, a suitable valve (not shown) may release the confined fluid within the cylinder 69 so that the compressed coil spring 75 will force the rod 59 back into the cylinder 69 and shift the male die 79 so as to release the completed flare of the tube 115. The tube 115 may then easily be removed from the clamp 117 and slipped out from the aperture 109 of the female die 93.

Figure 9:
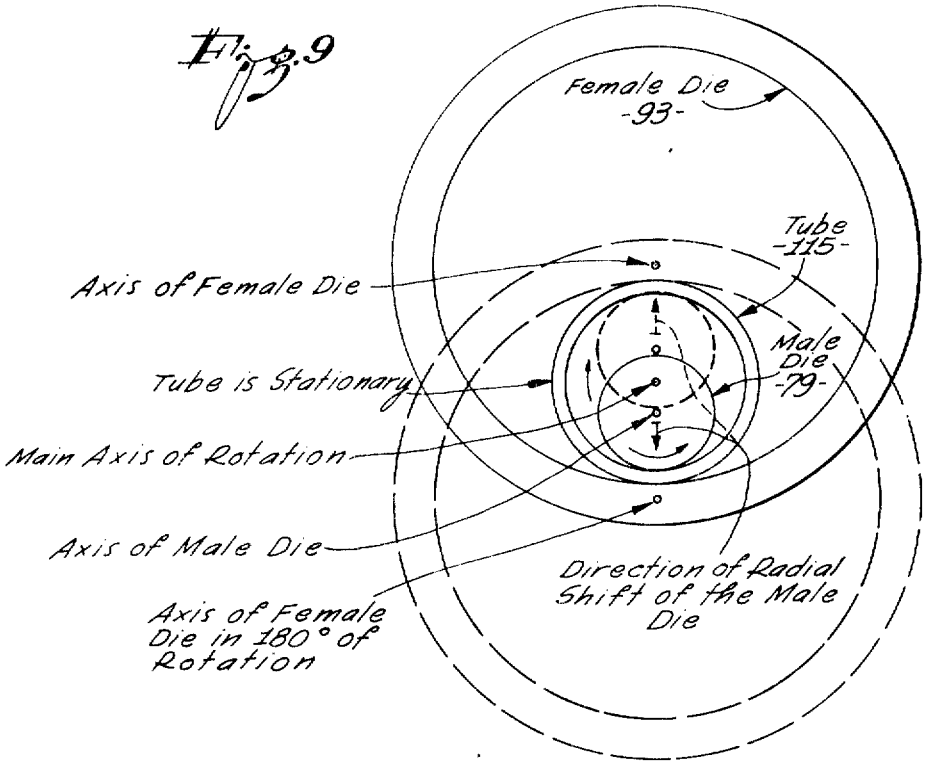
*FIGURES 9 and 10 are diagrammatical views illustrating two modes of operation of embodiments of the invention.*

The type of surface contact between the tube 115 and dies 79 and 93 is unique in flaring machines. *As shown in FIGURE 9, with the tube 115 concentric to the main axis of rotation, with the female die 93 surrounding the tube and with the male die 79 extending into the end of the tube, both of the dies move in orbits around the main axis of rotation with both dies rotating in rolling contact with the tube as the male die is progressively shifted radially outwardly of the main axis of rotation to flare the tube.* As between the cylindrical surface area 111 of the female die 93 and the outer surface of the tube 115 a rolling contact will occur; and as between the completed flare of the tube 115 and the cone surface 113 of the female die 93 a differential rolling and sliding contact will occur. Also, as between the male die 79 and completed flare of the tube 115 a differential rolling and sliding contact will occur. A slight sliding between the dies 79 and 93 and the completed flare of the tube 115 is not detrimental and will tend to smooth the flare surface.

Figure 7:
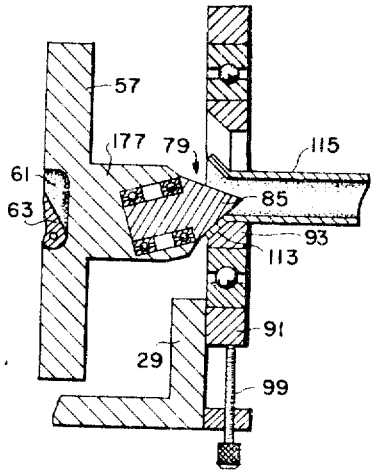
FIGURES 7 and 8 are cross-sectional partial elevation views showing modifications of the machine of FIGURE 1*; and*

A modification to obtain a different type contact between the tube 115 and the male die 79 is illustrated in FIGURE 7. As shown, the rectangular plate mount 57 has a modified tubular boss 177 with an internal bore angularly related to the housing's longitudinal axis. The angularity of the bore of the tubular boss 177 is such that the apex of the cone shaped head 85 of the male die 79 rotatively mounted therein will coincide with the apex of the developed flare cone of cone surface area 113 of the female die 93. Thus, a pure rolling contact will occur between the male die 79 and the completed flare of the tube 115.

Figure 8:
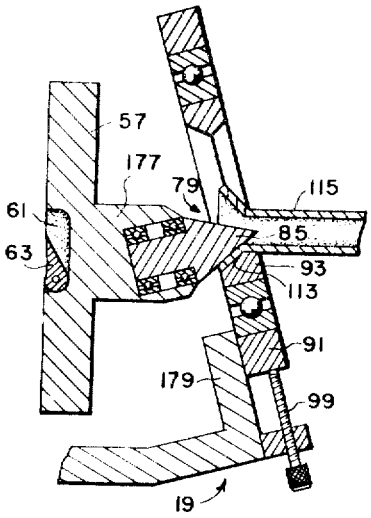

If, in addition, it is desired that a pure rolling contact be obtained between the cone surface area 113 of the female die 93 and the completed flare of the tube 115, the modification illustrated in FIGURE 8 may be used. In this instance, the housing 19 has a modified front wall 179 which makes an obtuse angle to the housing's longitudinal axis. The angularity of the front wall 179 is such that the apex of the developed cone surface area 113 of the female die 93 will coincide with the apex of the developed outer cone surface of the flare of the tube 115.

*In all three of the described embodiments of the invention the cone angle of the male die substantially equals the cone angle of the desired flare of the tube less twice the angle of the axis of male die relative to the main axis of rotation. Thus in the first embodiment where the axis of the male die is parallel with the main axis of rotation, the cone angle of the male die substantially equals the cone angle of the desired flare of the tube. In the second and third embodiments shown in FIGURES 7 and 8 respectively, however, the axis of the male die is at an acute angle relative to the main axis of rotation. If this acute angle is A degrees the cone angle of the male die is substantially the desired cone angle of the flare of the tube minus 2A degrees.*

*The same rule applies to the female die. Thus in the first and second embodiments of the invention where the axis of the female die is parallel with the main axis of rotation, the cone angle of the working surface of the female die substantially equals the desired cone angle of the flare of the tube. But in the third embodiment shown in FIGURE 8 where the axis of the female die is inclined A degrees from the main axis of rotation, the cone angle of the working surface of the female die substantially equals the cone angle of the desired flare minus 2A degrees.*

Figure 10:
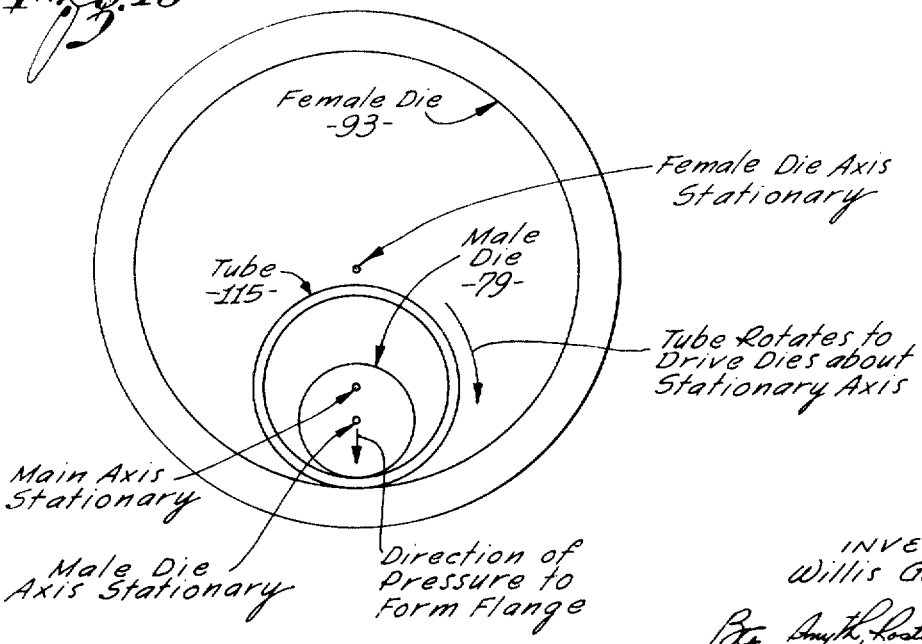

It is apparent that a novel machine has been developed which utilizes a housing with a rotatable mounted female die which receives the end of a tube. While in the embodiments described, the unique rotation relationship between the tube and housing has been illustrated by the rotation of the housing about a stationary tube, it is evident that the same unique rotation relationship can also be achieved by rotation of the tube while the housing is held stationary. *FIGURE 10 shows diagrammatically this second mode of operation of the invention in which the first support structure that carries the two dies is stationary and the second support structure that carries the tube rotates to rotate the tube concentrically on the main axis of rotation. Thus the tube drives the two dies on their stationary axes.*

Obviously, many modifications and variations of the present invention are possible in light of the above teachings. It is, therefore, to be understood that within the scope of the appended claims the invention may be practiced other than as specifically described.

What is claimed is:

1. A tube flaring machine, comprising:

[(a) a tubular shell]

[(b)] a [cylindrical] housing adapted to rotate about its longitudinal axis [;] ,

[(c) means for rotatively mounting said housing within said tubular shell;]

[(d)] said [cylindrical] housing having an interior chamber defined by a [cylindrical] side wall, a front wall, and a rear wall [;] ,

[(e)] said rear wall having a rectangular slot therein with a rear countersunk portion;

[(f)] a closure plate secured to the outer surface of said rear wall;

[(g)] said closure plate having an outwardly extending tubular shaft symmetrically aligned with the housing's longitudinal axis;

[(h)] means for rotating said tubular shaft and housing;

[(i)] a plate mount slidably located within said rectangular slot and countersunk portion;

[(j)] a rod slidably located within said tubular shaft;

[(k)] a link means for connecting said rod and said plate mount;

[(l) said plate mount having a tubular boss;]

[(m)] a male tube flaring die rotatively mounted [within said tubular boss] *on said plate mount*;

[(n)] said front wall of said housing having a large aperture;

[(o)] a support having a unitary circular female tube flaring die rotatively mounted therein; and

[(p)] means for slidably positioning said support on the outer surface of said front wall whereby the center of said female die may be located eccentric to the housing's longitudinal axis.

2. In a machine for flaring the end portion of a tube, the combination comprising:

[(a)] a housing adapted to rotate *on a main axis, said main axis being* [about] the longitudinal axis of the tube to be flared;

[(b)] a female die having a circular inner perimetric surface defining an aperture [with inner and outer openings;] ,

[(c)] said perimetric surface adjacent the outer [opening] *side* of said aperture being shaped to form a cylindrical area;

[(d)] said perimetric surface adjacent the inner [opening] *side* of said aperture being shaped to form a cone frustum area;

[(e)] means for rotatively supporting said female die on said housing [so as to locate its center] *with its axis* eccentric to the longitudinal axis of the tube to be flared *for movement of the axis of the female die in an orbit around said main axis*;

[(f)] a male die having a cone [frustum] head extending partially within the aperture of said female die; and

[(g)] means for rotatively supporting said male die on said housing *with the axis of the male die offset from said main axis for movement in an orbit about the main axis.*

3. In a machine for flaring the end portion of a tube, the combination comprising:

[(a)] a housing adapted to rotate about *a main axis, said main axis being* the longitudinal axis of the tube to be flared;

[(b)] a female die having a circular inner perimetric surface [defining an aperture with inner and outer openings] ;

[(c)] means for rotatively supporting said female die on said housing [so as to locate its center] *with its axis* eccentric to *said main axis for movement in an orbit about the main axis* [the longitudinal axis of the tube to be flared] ;

[(d)] a male die having a flaring cone which is adapted to extend partially within the aperture of said female die; and

[(e)] means for rotatively supporting said male die *on said housing with the axis of the male die eccentric to said main axis.*

4. In a machine for flaring the end portion of a tube, the combination comprising:

[(a)] a housing;

[(b)] a unitary female die having an inner perimetric surface defining an aperture [with inner and outer openings;] ,

[(c)] said perimetric surface having a cone flaring surface adapted for contact with the outer surface of the tube end portion to be flared;

[(d)] means for rotatively supporting said female die on said housing [so as to locate its center] *with its axis* eccentric to the longitudinal axis of the tube to be ffared;

[(e)] a male tube flaring die having a flaring cone which is adapted to extend partially within the aperture of said female die for contact with the inner surface of the tube end portion to be flared; [and]

[(f)] adjustable means for rotatively supporting said male die on said housing;

*holding means separate and apart from said dies to hold the tube with the axis of the tube stationary; and*

*means to rotate one of said housing and said holding means about the axis of the tube with the other of said housing and holding means stationary with respect to rotation about the tube.*

5. A tube flaring machine, comprising:

[(a)] a housing adapted to rotate about its longitudinal axis which [will coincide] *coincides* with the longitudinal axis of the tube to be flared;

[(b)] said housing having an interior chamber with a front opening;

[(c)] means for rotating said housing about its longitudinal axis;

[(d)] a female die having an inner perimetric surface defining an aperture [with inner and outer openings];

[(e)] said perimetric surface having a cone flaring surface adjacent its inner [opening] *side*;

[(f)] means for rotatively supporting said female die over the front opening of said housing and on said housing [so as to locate the center] *with the axis* of the aperture of the female die eccentric to the longitudinal axis of the housing;

[(g)] a male tube flaring die having a cone surface; and

[(h)] adjustable means for rotatively supporting said male die within the interior chamber of said housing [so that] *with* the cone surface of the male die [extends] *extending* [through the inner openings of] *into* the female die.

*6. In an apparatus of the character described for reshaping the end of a tube, the combination of:*

*a first support means having a main axis extending therethrough;*

*a rotary female shaping die mounted on said first support means and encircling said main axis with the axis of the female die offset radially of the main axis;*

*a second support means concentric to the main axis to hold the tube concentrically of the main axis with the end of the tube extending into the female die for contact with the inner circumferential surface thereof;*

*a rotary male shaping die mounted on said first support means and extending into the female die in position to contact the inner circumferential surface of the end of the tube;*

*means to cause relative rotation between said first and second support means on said main axis to cause rotation of the female and male dies in rolling contact with the outer and inner circumferential surfaces respectively of the end of the tube; and*

*means to shift at least one of the two dies during the rolling contact of the two dies for cooperation of the two dies to reshape the end of the tube.*

*7. In an apparatus of the character described for flaring the end of a tube, the combination of:*

*a first support means having a main axis extending therethrough;*

*a rotary female flaring die mounted on said first support means and encircling said main axis with the axis of the female die offset radially of the main axis, said die having a cone surface;*

*a second support means concentric to the main axis to hold the tube concentrically of the main axis with the end of the tube extending into the female die for contact with the inner circumferential surface thereof;*

*a rotary conical male flaring die mounted on said first support means and extending into the female die in position to contact the inner circumferential surface of the end of the tube;*

*means to rotate one of said first and second support means on said main axis to cause rotation of the female and male dies in rolling contact with the outer and inner circumferential surfaces respectively of the end of the tube; and*

*means to shift the male flaring die radially outwardly of the main axis during the rolling contact of the two dies to flare the end of the tube against the inner circumferential surface of the female die.*

*8. A combination as set forth in claim 7 in which the axis of the male die is parallel with the main axis and the cone angle of the male die substantially equals the cone angle of the desired flare of the end of the tube.*

*9. A combination as set forth in claim 7 in which the axis of the male die is at a given acute angle to the main axis and the cone angle of the male die substantially equals the desired cone angle of the flare of the end of the tube less twice said given angle.*

*10. A combination as set forth in claim 9 in which the axis of the female die is at said given angle relative to the main axis; and*

*in which the cone angle of the female die substantially*

*equals the desired cone angle of the flare of the end of the tube less twice said given angle.*

*11. In an apparatus of the character described for reshaping the end of a tube, the combination of:*

*a first support means having a main axis extending therethrough;*

*a rotary female shaping die mounted on said first support means and encircling said main axis with the axis of the female die offset radially of the main axis;*

*a second support means concentric to the main axis to hold the tube concentrically of the main axis with the end of the tube extending into the female die for contact with the inner circumferential surface thereof;*

*a rotary male shaping die mounted on said first support means and extending into the female die in position to contact the inner circumferential surface of the end of the tube;*

*said male die being movable on the first support means radially of said main axis;*

*yielding means urging said male die radially inward towards the main axis;*

*means operable to shift said male die radially outwardly in opposition to said yielding means; and*

*means to rotate one of said first and second support means on said main axis to cause rotation of the*

*female and male dies in rolling contact with the outer and inner circumferential surfaces respectively of the end of the tube.*

*12. A combination as set forth in claim 11 in which said means to rotate includes a hollow shaft extending along the main axis and connected to the first support means for rotation thereof; and*

*in which the means operable to shift the male die includes an operating member extending along the main axis inside the hollow shaft.*

References Cited

The following references, cited by the Examiner, are of record in the patented file of this patent or the original patent.

UNITED STATES PATENTS

| | | | |
|---|---|---|---|
| 893,434 | 7/1908 | Brinkman | 285—368 |
| 1,596,538 | 8/1926 | Ingram | 72—94 |
| 2,524,420 | 10/1950 | Blampin | 72—95 |
| 2,924,263 | 2/1960 | Landis | 72—117 |
| 2,962,079 | 11/1960 | Wilson | 72—117 |
| 3,041,990 | 7/1962 | Le Fiell | 72—84 |

FOREIGN PATENTS

| | | |
|---|---|---|
| 791,514 | 3/1958 | Great Britain. |

RICHARD J. HERBST, *Primary Examiner.*